US012668469B1

(12) United States Patent
Hart

(10) Patent No.: US 12,668,469 B1
(45) Date of Patent: Jun. 30, 2026

(54) FORKLIFT MECHANISM

(71) Applicant: Timmy Ray Hart, Bellingham, WA (US)

(72) Inventor: Timmy Ray Hart, Bellingham, WA (US)

( * ) Notice: Subject to any disclaimer, the term of this patent is extended or adjusted under 35 U.S.C. 154(b) by 233 days.

(21) Appl. No.: 18/402,754

(22) Filed: Jan. 3, 2024

Related U.S. Application Data

(60) Provisional application No. 63/436,760, filed on Jan. 3, 2023.

(51) Int. Cl.
*B66F 9/065* (2006.01)
*B66F 9/14* (2006.01)

(52) U.S. Cl.
CPC .............. *B66F 9/0655* (2013.01); *B66F 9/14* (2013.01)

(58) Field of Classification Search
CPC .......... B66F 9/0655; B66F 9/085; B66F 9/14; B66F 9/142; E02F 3/3609; E02F 3/3618; E02F 3/3622
USPC ................................. 414/501, 685, 722, 723
See application file for complete search history.

(56) References Cited

U.S. PATENT DOCUMENTS 3,836,025 A * 9/1974 Olson .................. B66F 9/0655 414/718
4,013,182 A * 3/1977 Pratt ..................... E02F 3/3618 414/723
4,034,875 A * 7/1977 Pugh ..................... B66F 9/0655 414/718
4,042,135 A * 8/1977 Pugh ..................... B66F 9/0655 414/718
4,382,743 A * 5/1983 Newell ................... B66F 9/122 414/718
4,690,609 A * 9/1987 Brown .................. B60P 1/5452 414/544
4,822,237 A * 4/1989 Meyer .................. B66F 9/0655 414/718
4,986,721 A * 1/1991 Lowder ................. B66F 9/0655 414/667

(Continued)

FOREIGN PATENT DOCUMENTS

DE 202004007099 U1 * 7/2004 .............. B66F 9/085
EP 2644561 A1 * 10/2013 ............ B66F 9/0755

(Continued)

*Primary Examiner* — Saul Rodriguez
*Assistant Examiner* — Brendan P Tighe
(74) *Attorney, Agent, or Firm* — Puget Sound Patents; Dwayne E Rogge

(57) ABSTRACT

A mechanism with a carriage assembly to be mounted to a vehicle such as a boom lift. A pair of first lifting forks mounted on the carriage assembly longitudinally directed substantially toward the vehicle such that the distal end of the forks are closer to the main body of the vehicle than the proximal end of the forks. The proximal end of the first lifting forks are attached to the carriage assembly. A pair of second lifting forks which are laterally movable on the carriage assembly to allow for lifting of loads of varying widths. The second lifting forks having a proximal end attached to the carriage assembly, a distal end. The first lifting forks extending from the carriage assembly in a first longitudinal direction, the second lifting forks extending from the carriage assembly in a second longitudinal direction substantially opposing the first longitudinal direction.

7 Claims, 8 Drawing Sheets

(56) References Cited

U.S. PATENT DOCUMENTS

| | | | | |
|---|---|---|---|---|
| 6,726,436 | B2 * | 4/2004 | Baumann | E02F 3/286<br>180/311 |
| 10,800,312 | B2 * | 10/2020 | Havas | B66C 23/42 |
| 2005/0095106 | A1 * | 5/2005 | Pearce | B66F 9/122<br>414/627 |
| 2011/0176899 | A1 * | 7/2011 | Huissoon | E02F 3/36<br>414/687 |
| 2015/0060199 | A1 * | 3/2015 | Overfield | B66F 11/04<br>182/69.4 |
| 2019/0194004 | A1 * | 6/2019 | Bailey | F15B 19/005 |
| 2024/0002202 | A1 * | 1/2024 | Berry | B66F 9/07577 |

FOREIGN PATENT DOCUMENTS

| | | | | |
|---|---|---|---|---|
| GB | 1103603 | A * | 2/1968 | B66F 9/085 |
| WO | WO-0075437 | A1 * | 12/2000 | E02F 3/3622 |

* cited by examiner

FORKLIFT MECHANISM

This application claims priority benefit of U.S. Provisional Ser. No. 63/436,760 filed Jan. 3, 2023, incorporated herein by reference.

BACKGROUND OF THE DISCLOSURE

Field of the Disclosure

This disclosure relates to the field of attachments for vehicles. The attachment including a carriage assembly which is removably attached to a boom of the vehicle or similar structure for lifting and repositioning of loads.

BRIEF SUMMARY OF THE DISCLOSURE

Disclosed herein is a forklift mechanism. The mechanism in one example comprising a carriage assembly which is configured to be mounted to a vehicle such as a forklift or boom lift vehicle. The vehicle having a lifting structure configured to vertically raise the carriage assembly and structures supported by the carriage assembly when desired. A pair of first lifting forks are mounted on the carriage assembly, these first lifting forks are longitudinally directed substantially toward the vehicle such that the distal ends of the first lifting forks are closer to the main body of the vehicle than the proximal ends of the forks. The proximal ends of the first lifting forks are attached to the carriage assembly. A boom is also disclosed in one example. The boom is attached to the vehicle and extends longitudinally past a distal end of the first lifting forks to the proximal end of the first lifting forks. Also disclosed is a pair of second lifting forks which may be laterally movable on the carriage assembly to allow for lifting of loads of varying widths. The second lifting forks having a proximal end attached to the carriage assembly and a distal end. The first lifting forks extending from the carriage assembly in a first longitudinal direction, the second lifting forks extending from the carriage assembly in a second longitudinal direction substantially opposing the first longitudinal direction.

DETAILED DESCRIPTION OF THE DISCLOSURE

Figure 1:
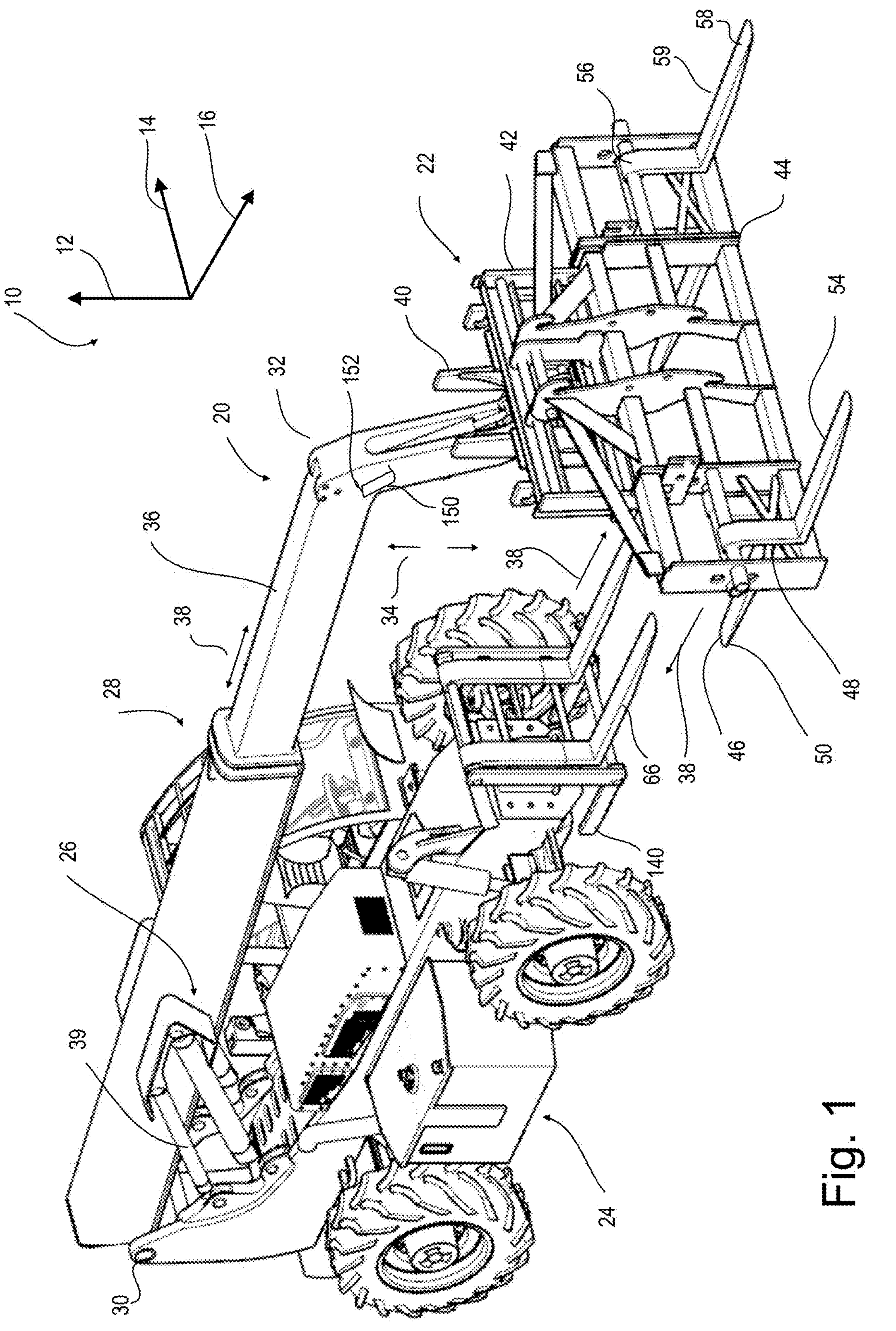
FIG. 1 is a front perspective view of one example of the forklift mechanism disclosed herein attached to a boom lift vehicle.

In the art of lifting, transporting, and repositioning of cargo or material with a forklift or similar device which lifts cargo by supporting from the underside there can be a tendency for the cargo to become unstable. This is additionally true when lifting without suspension straps extending to a crane or similar apparatus from above.

In the prior art, it was often provided that a lifting vehicle have a plurality of lifting forks attached to the front of the vehicle and extending away therefrom such that the distal end of the forks is further from the main body of the vehicle than the proximal end. It may also be arranged to have the lifting forks attached to the end of a lifting boom wherein these lifting forks were able to be raised vertically, and/or moved laterally. This arrangement allows small and simple cargoes to be lifted and repositioned as needed. Wherein most cargoes were attached to rest upon a pallet having a specific dimension generally smaller than the length of the lifting forks, no other configuration was needed.

Occasionally, larger loads need to be lifted, this is often accomplished using lifting straps, chains, cables with a first end attached to the cargo, wherein the opposing end of the lifting straps is attached to a boom, crane, etc. for lifting and repositioning. This method requires that the lifting straps, and any other lifting structure positioned below the cargo be removed at the end of transport. In some applications, this method slows operation and in some instances cannot be accomplished, such as when the attachment points for the lifting straps are not accessible once the cargo was in position.

In this disclosure, an axis system 10 is described herein for ease in understanding. It is to be understood that the apparatus may be used in other orientations, and that this axis system 10 is for description purposes only. The axis system 10 includes vertical axis 12, a lateral axis 14, and a longitudinal axis 16 each orthogonal to the other axes.

The apparatus disclosed herein solves many problems by providing a forklift mechanism 20 comprising in part a carriage assembly 22, which attaches to a vehicle/forklift/boom lift 24. In the example shown in FIG. 1, the vehicle 24 comprises an engine, wheels, control, cab, driving mechanism, and other components common to such vehicles. This example vehicle also comprises a lifting structure 26, which may be hydraulic actuators 39, which rotate a boom 28 about a boom pivot 30. Such rotation causes a distal end 32 of the boom 28 to raise and lower 34 in the vertical axis 12.

In this example is also shown a boom extension 36 which repositions 38 to extend the distal end 32 of the boom 28 relative to the proximal end. Wherein the carriage assembly 22 is attached to the distal end 32, repositioning of the boom extension 36 will cause the carriage assembly 22 to likewise reposition.

One substantial advantage of the carriage assembly 22 as described herein provides for a plurality of carriages, which may be used in combination or used independently as desired. Several of these examples is shown and described in detail. In the example of FIG. 1 is shown a first carriage 40 which is removably attached to the boom, 28, a second carriage 42 attached to the first carriage 40, and a third carriage 44 attached to the second carriage 42. Again, these examples will be described in more detail.

Figure 2:
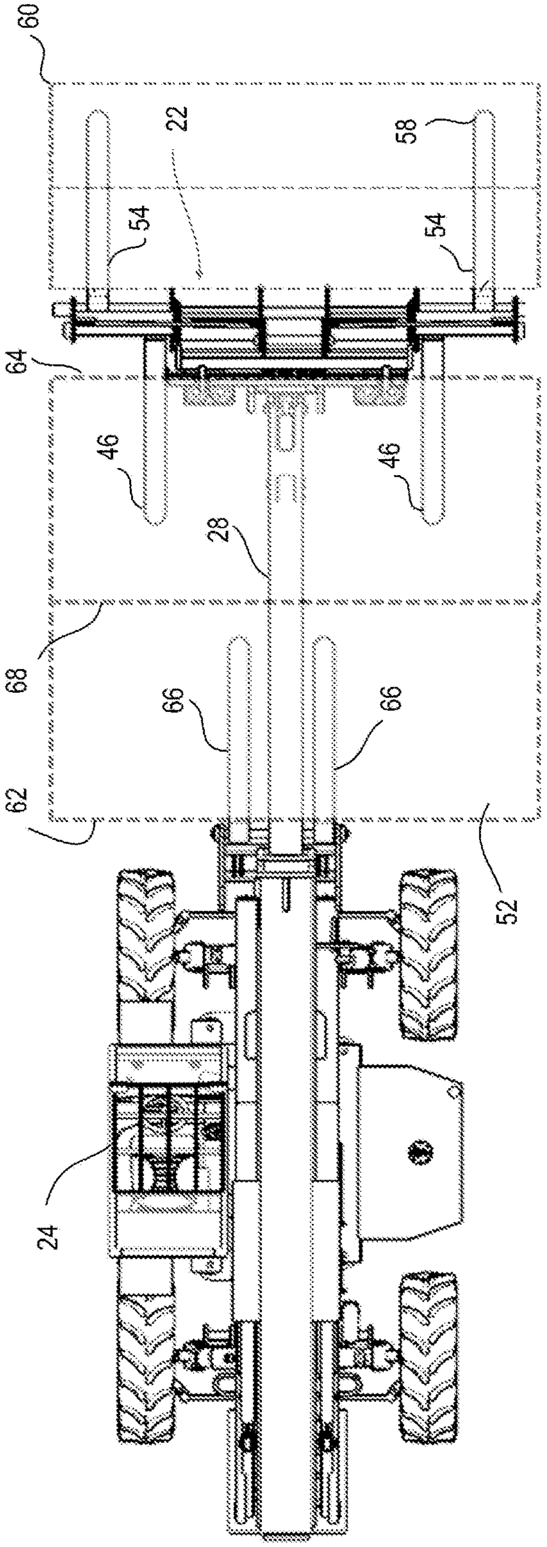
FIG. 2 is a top view of the apparatus shown in FIG. 1.
Figure 3:
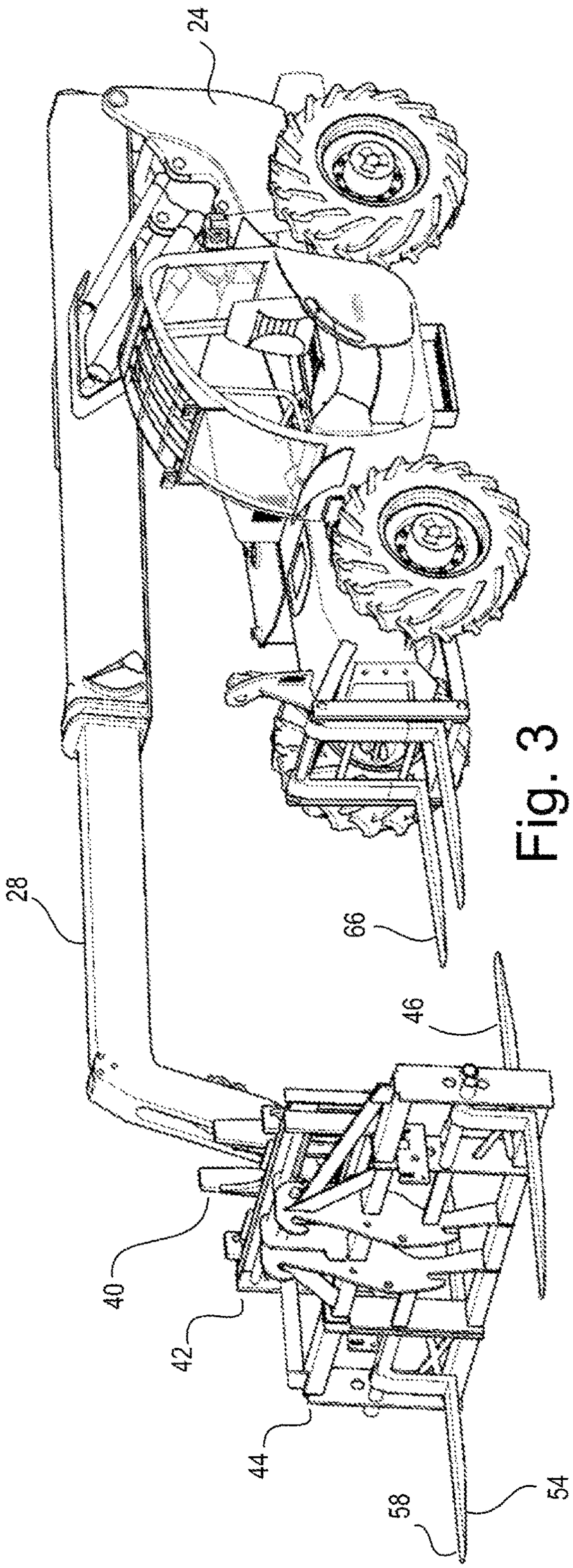
FIG. 3 is a front isometric view of the apparatus shown in FIG. 1.

Lifting forks may be attached to these carriages, 40, 42, 44, in different orientations as desired, or the carriages, may be attached to each other, and the lifting forks attached thereto. In the example of FIG. 1 a pair of first lifting forks, 46, are attached to the third carriage 44. These first lifting forks, 46 having a proximal end 48 attached to the third carriage 44, each with a distal end 50 closer to the vehicle 24 than the proximal end 48. This is a unique arrangement from known prior art in that the first lifting forks 46 point toward the vehicle 24 rather than away from the vehicle 24. This allows the cargo 52 to be lifted as shown in FIG. 2 with the cargo 52 positioned between the carriage assembly, 22 and the vehicle 24.

This arrangement is particularly useful where it is desired to position the cargo 52 where a first edge 62 may not be accessible to a traditional forklift, where positioning of the cargo 52 requires that the second edge 64 is accessible to the lifting forks 46 but the first edge 62 may not be, or other examples where it is necessary to lift the cargo 52 from the edge, opposing the vehicle 24.

In one example of use, construction of a bridge surface may be conducted wherein the surface panels are positioned such that the first edge 62, is positioned adjacent to the second edge 64 of a previously positioned panel. The previously positioned panel then formed a support structure upon which the vehicle 24 was driven. Thus, it may not be not possible, using traditional forklifts, to position the panels due to the fact that the first edges 62 may not be accessible once the panels are positioned.

In addition, the reversible third carriage 44 with the forks 46 directed toward the vehicle 24 allows for cargo to be placed, and either pushed away from the vehicle 24 or alternatively pulled toward the vehicle 24 as desired for correct placement.

Returning to FIG. 1 is shown an example, wherein a pair of second lifting forks 54 are also attached to the carriage 44. These second lifting forks have a proximal end 56 attached to the third carriage 44 and a distal end 58 further away from the vehicle 24 than the proximal end 56. This allows the carriage assembly 22 to be used in a more traditional manner as shown in FIG. 2 where a cargo 60 is being raised by the second lifting forks 54.

The arrangement shown in FIG. 1 also allows the cargo 52 to be repositioned with the first lifting forks 46 and a third set of lifting forks 66 in combination. The combination supporting the cargo 52 on opposing longitudinal 16 sides. This may be particularly useful as shown in the example FIG. 2 where the cargo 52 has a center of mass 68 which cannot be positioned above the forks 46, 66. Thus, the cargo 52 bridges between the forks 46, 66 and is carried in this stable position.

Figure 7:
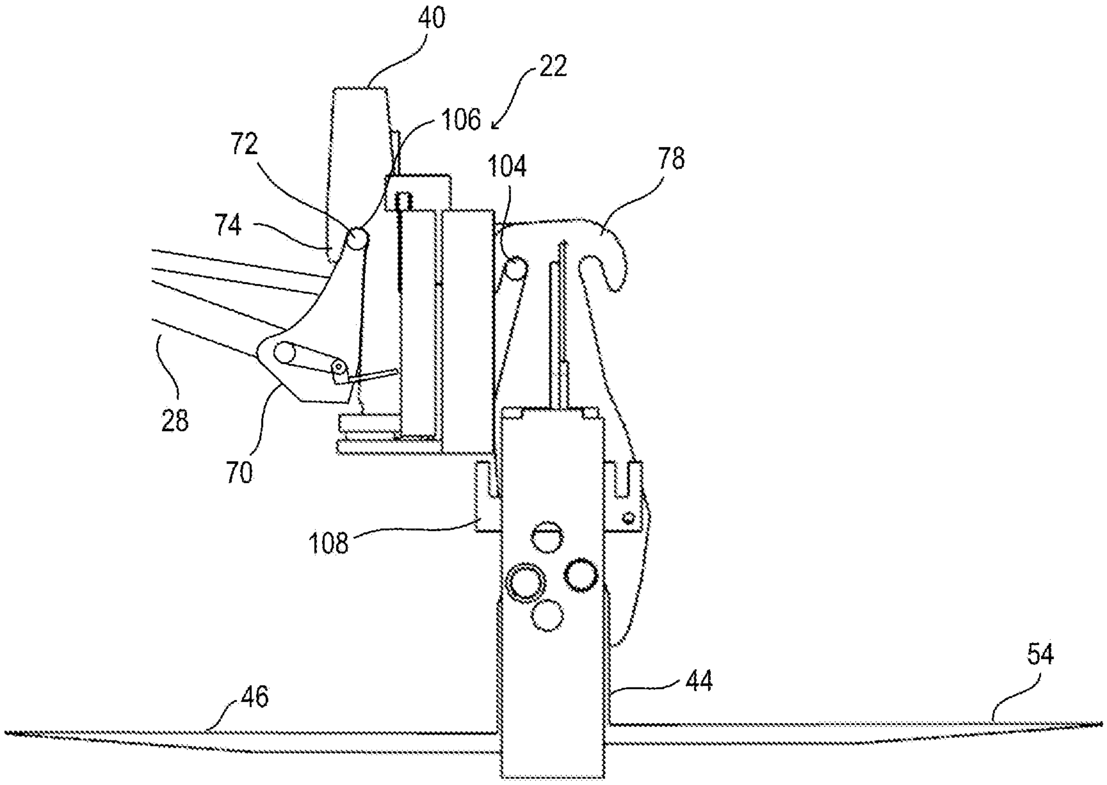
FIG. 7 is a side view of the forklift mechanism shown in FIG. 4.
Figure 17:
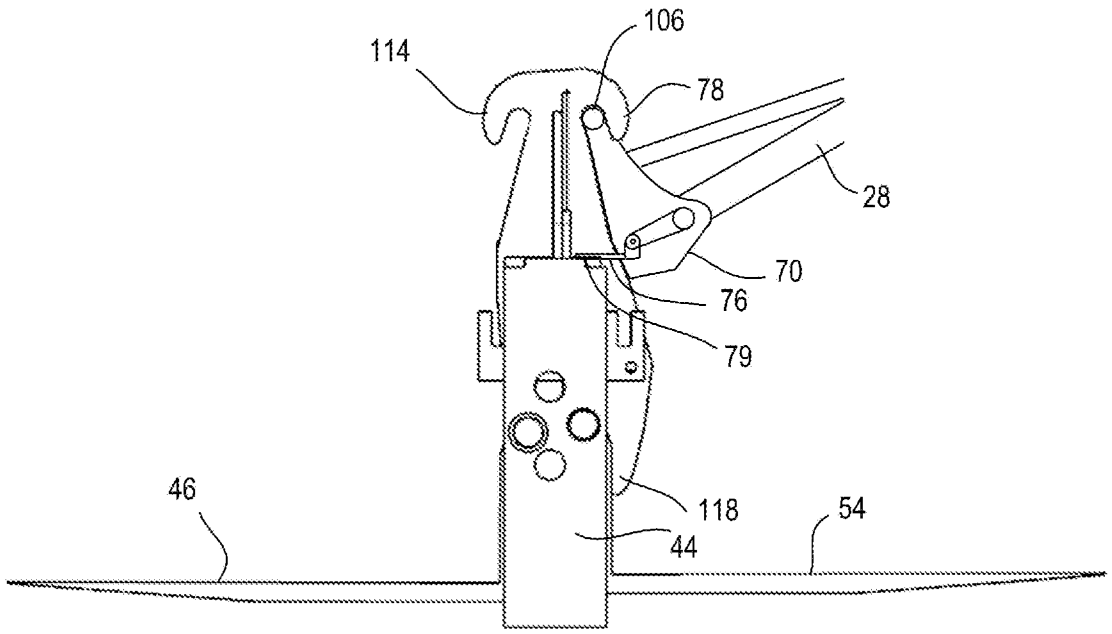
FIG. 17 is a side view of the forklift mechanism shown in FIG. 7 with a different attachment system.

During testing, it was found that utilizing a boom bracket 70 as shown in the example of FIG. 7 attached to the distal end of the boom 28 provides for an easily understood, simple, and secure attachment of the boom 28 to the first carriage 40 or alternatively directly to the third carriage 44 as shown in FIG. 17 by providing a common double pin/hook and latch system similar to known attachment systems and thus not requiring any modification to many booms present in the art already. For example, looking at FIG. 7 it can be seen that the boom bracket comprises a laterally extending pin 72 upon which rests a hook component 74 of the first carriage 40. In use, the weight of the carriage assembly 22 and attached may generally be sufficient to hold the carriage assembly 22 on the bracket 70. However, to ensure security, a latch system 76 (FIG. 17) may also be provided such as a rotating contact surface 79, which rotates to contact a surface of the carriage 40 and prohibit vertical 12 movement of the first carriage 40 relative to the bracket 70. In one example, using a Hydraulic coupler uses the same concept but is hydraulically opened and closed meaning that the operator doesn't have to leave the machine while changing attachments. This makes changing tools faster and easier than many other options on the job site, saving time and effort.

As can be further seen in the example shown in FIG. 17, it may be at times desired to connect the third carriage 44 directly to the boom bracket 70. For this purpose, a hook 78 equivalent to the hook 74 may be incorporated into the third carriage 44.

Figure 13:
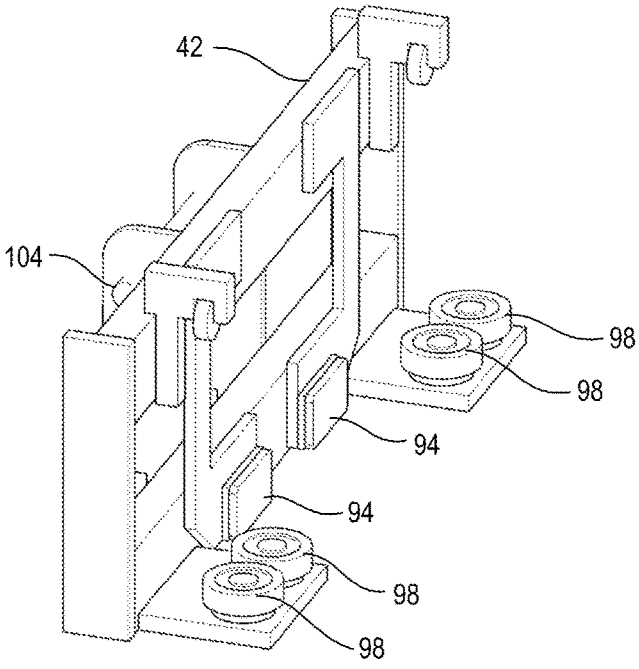
FIG. 13 is a perspective view of the component shown in FIG. 10.
Figure 14:
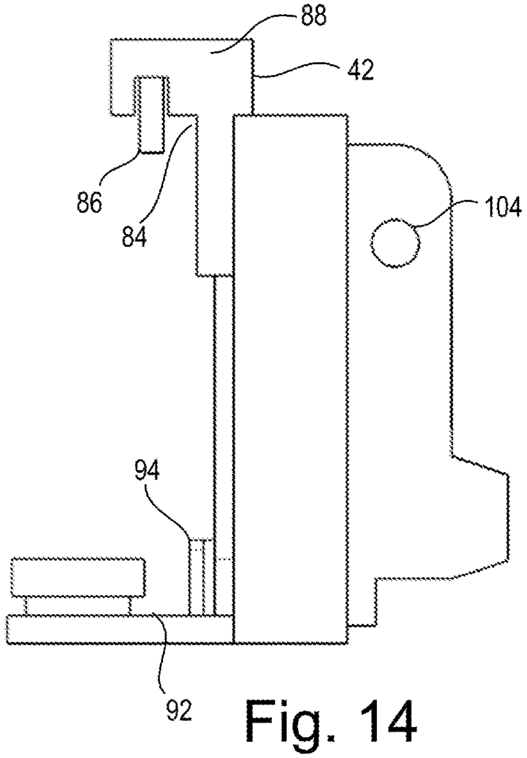
FIG. 14 is a side view of the component shown in FIG. 10.
Figure 15:
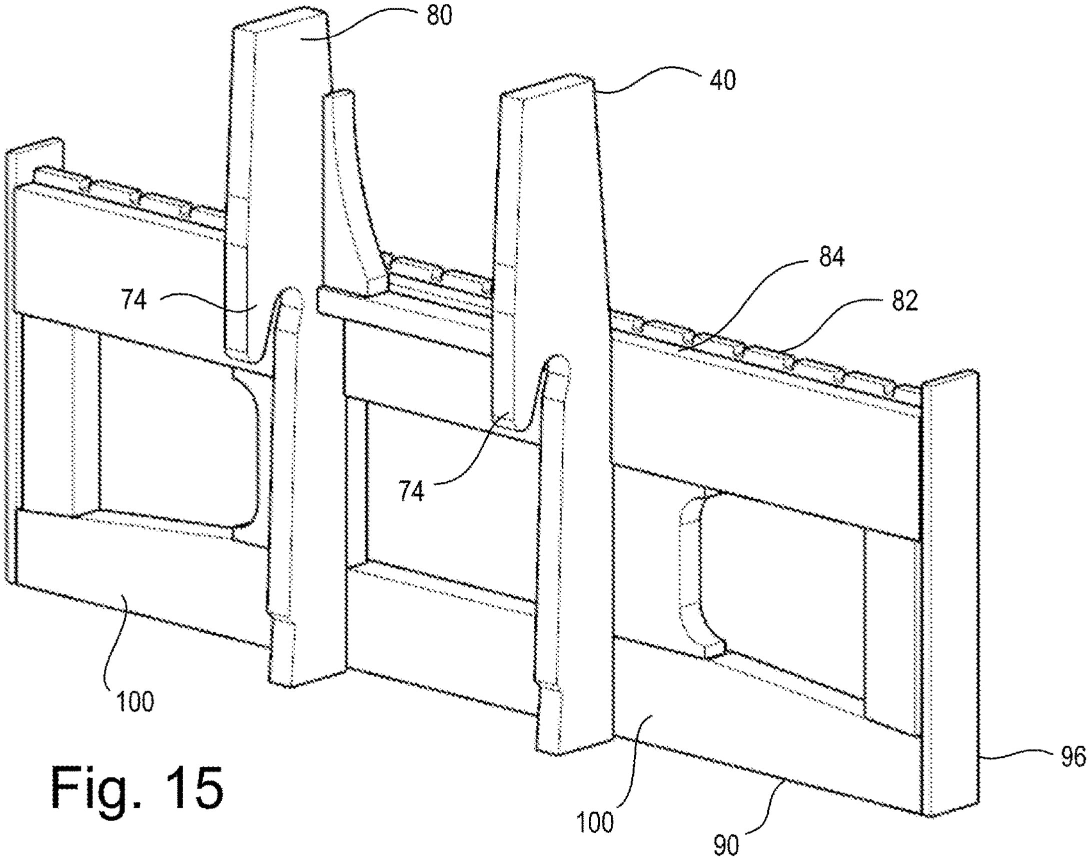
FIG. 15 is a rear perspective view of a carriage component shown in FIG. 4.
Figure 16:
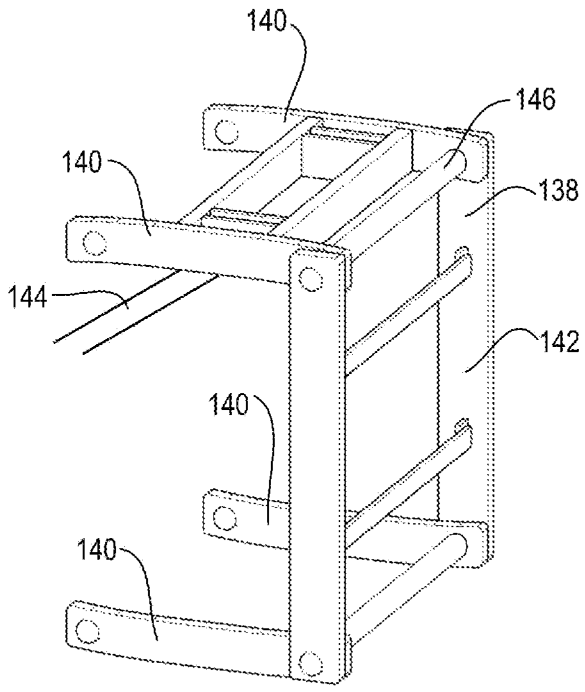
FIG. 16 is a perspective view of a helper component shown in FIG. 1.

Looking to the example of FIG. 15 it can be seen that the first carriage 40 comprises a frame 80 onto which are formed the surfaces of the hook(s) 74. As shown, each hook 74 is comprised of a pair of substantially parallel and aligned surfaces of the frame 80. In addition, the frame 80 of this example comprises a guide surface 82, which projects outward from a bearing surface 84. The use of this guide surface can be understood by looking to the second carriage 42 as shown in FIG. 13 and FIG. 14 in keeping the rollers properly positioned on the bearing surface 84. In the example of FIG. 14 it can be seen that the guide surface 82 fits in the channel 84 between a support bearing 86 and the frame 88. Thus, vertical movement of the first carriage 40 relative to the second carriage 42 is prohibited when a surface 90 of the first carriage 40 is adjacent a surface 92 of the second carriage 42 and is thus the first carriage 40 is positioned between the bearing 86 and the surface 92.

In the example shown, the bearing 86 rolls along the surface 84 and this provides smooth lateral movement of the second carriage 42 relative to the first carriage 40. In this example are also shown a plurality of slide surfaces 94 which occasionally slide along the surface 96 of the first carriage 40. In operation, the weight of the second carriage 42, third carriage 44, and any cargo resting thereupon is transferred to the bearings 86 as well as a plurality of bearings 98 which press against a surface 100 of the first carriage 40. Thus smooth lateral movement of the second carriage 42 relative to the first carriage 40 is enabled. In one example, an actuator 102 is provided to laterally reposition the second carriage 42 relative to the first carriage 40. This actuator 102 may be a linear hydraulic actuator, linear pneumatic actuator, rotary actuator, electric actuator, stepper motor, or equivalence and combinations thereof.

Figure 6:
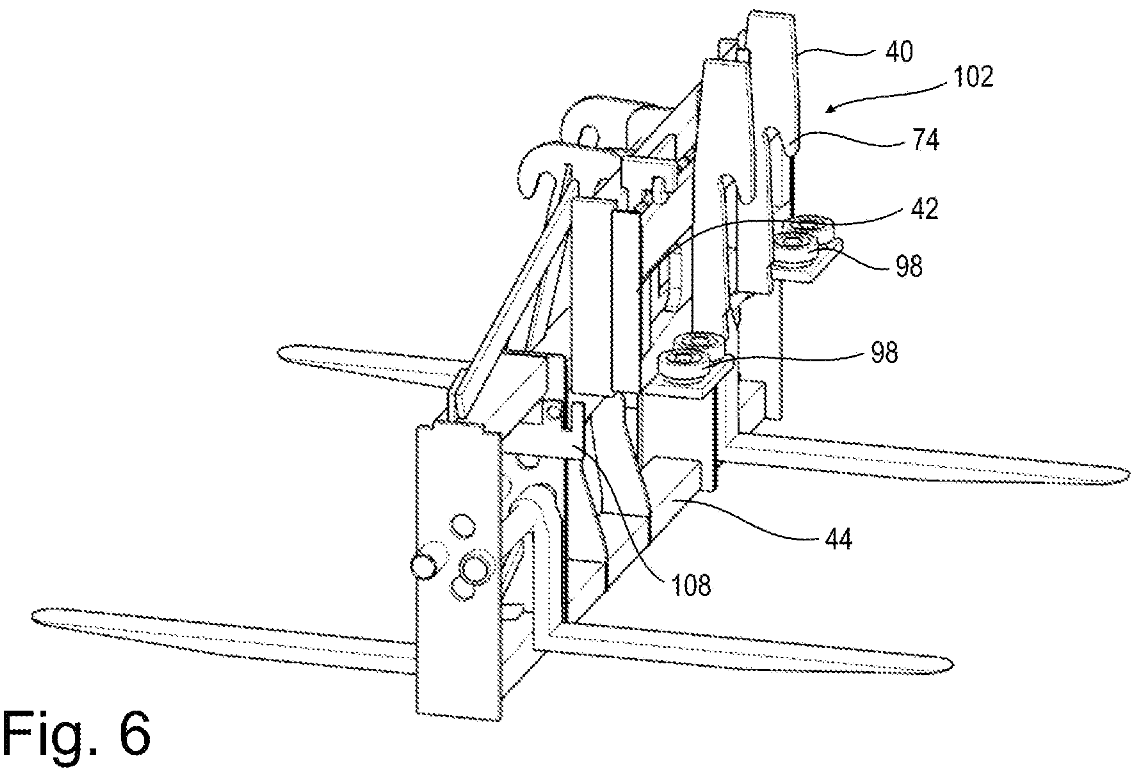
FIG. 6 is a side perspective view of the forklift mechanism shown in FIG. 4.

In this example is also shown a lateral pin 104 fixed to the second carriage 42, such as by welding or other methods. The pin 104 can be seen in FIG. 7 as the component upon which the hooks 78 of the third carriage 44 are attached. Whereas the third carriage 44 is attached to the second carriage 42 as shown in FIG. 6, a latching system such as the latch plate 108 is positioned to prohibit vertical movement of the third carriage 44 relative to the second carriage 42. Thus, the third carriage 44 is firmly connected to the second carriage, 42 and cannot be removed without repositioning or removal of the latch 108. The latch 108 may comprise other structures, including pins, magnetic catches, rotating armatures, and other similar structures.

Figure 8:
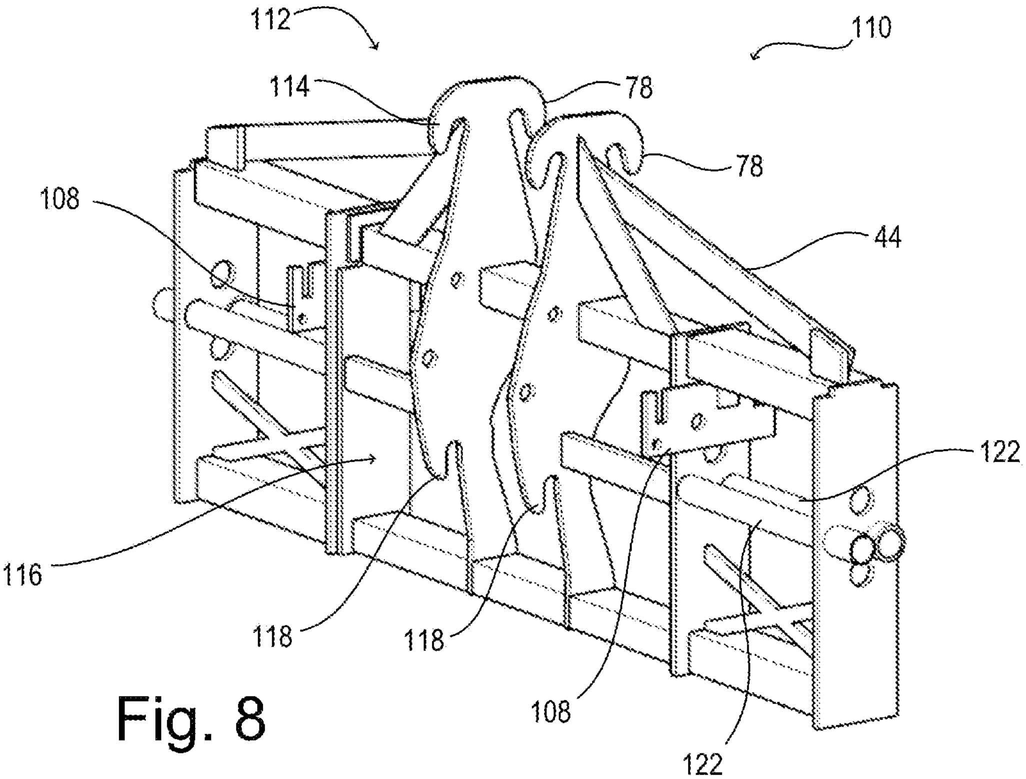
FIG. 8 is a side perspective view of a carriage component shown in FIG. 4.
Figure 9:
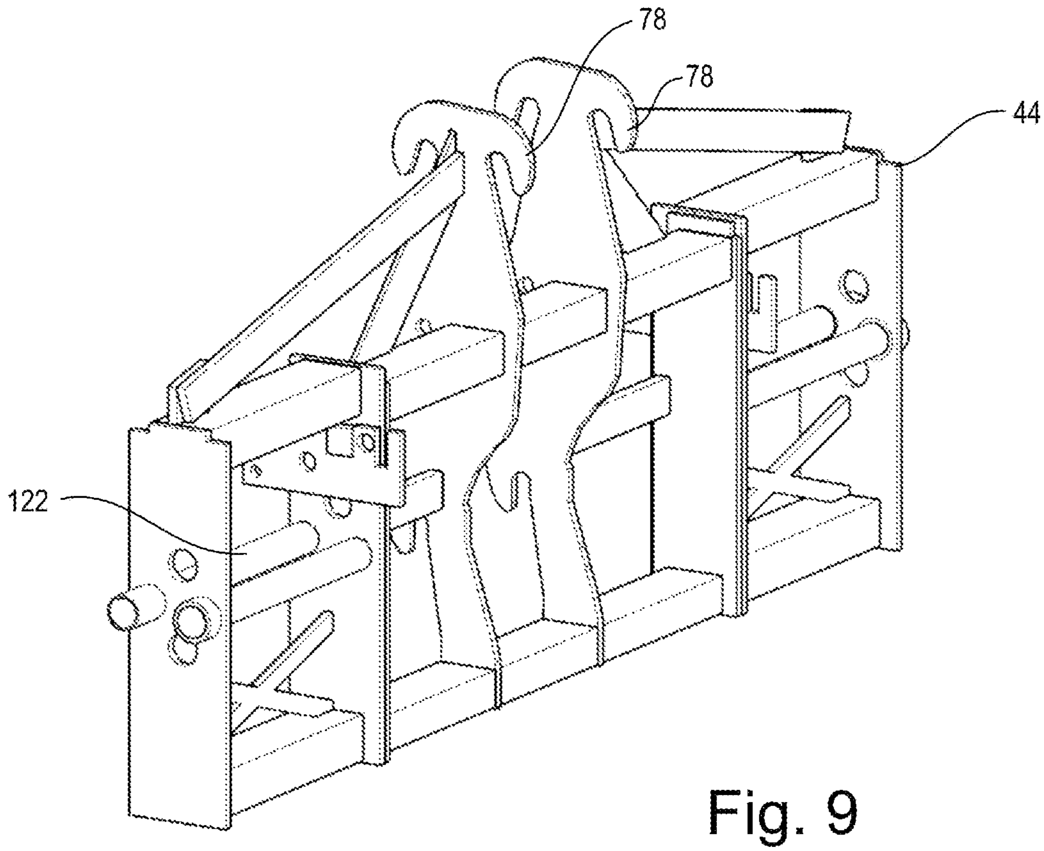
FIG. 9 is a reverse angle perspective view of the component shown in FIG. 8.
Figure 10:
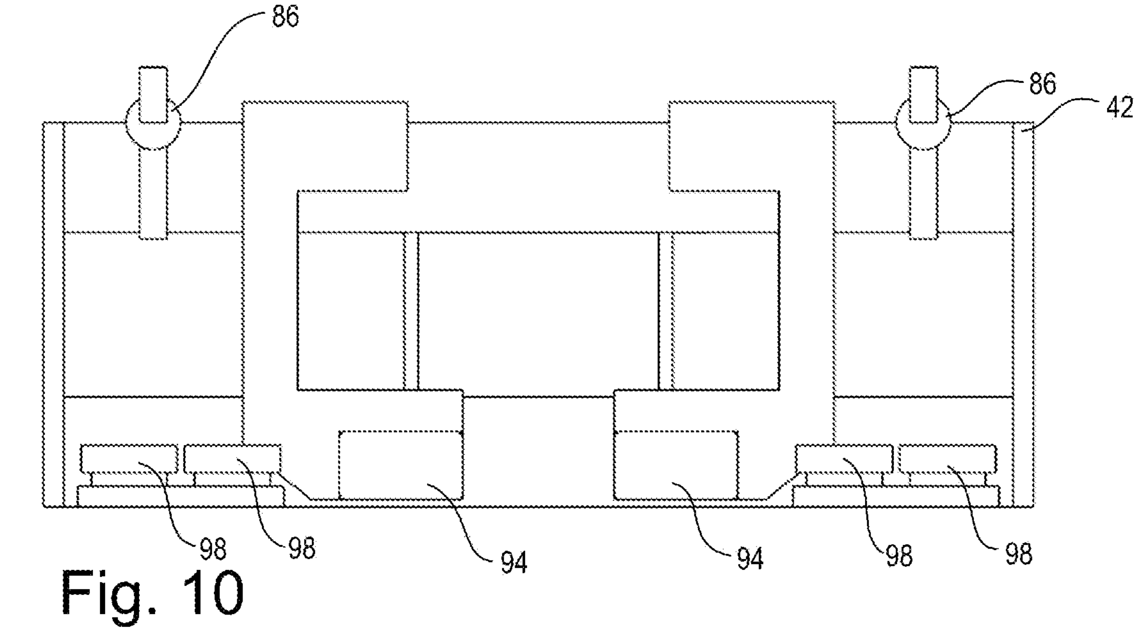
FIG. 10 is a rear view of a component shown in FIG. 4.
Figure 11:
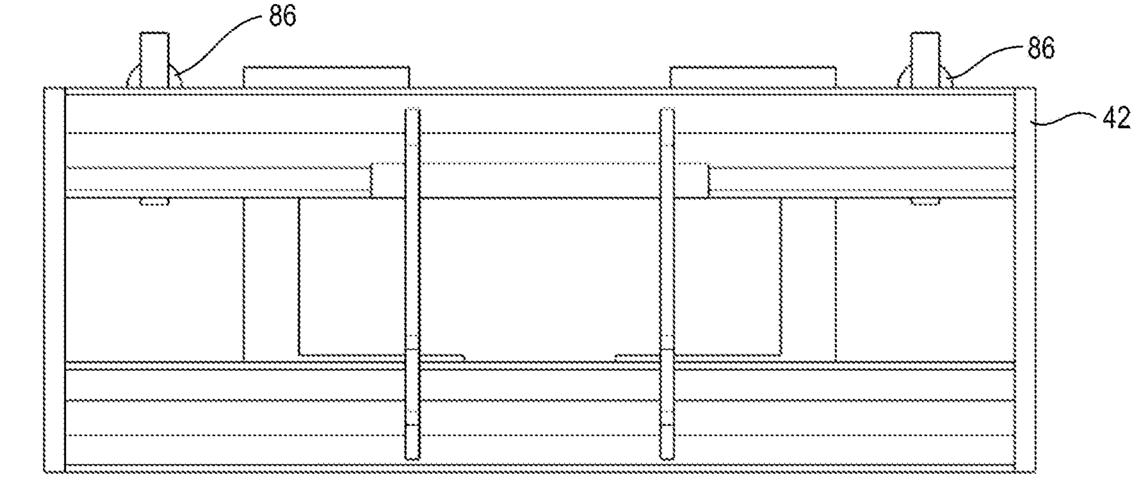
FIG. 11 is a front view of the component shown in FIG. 10.
Figure 12:
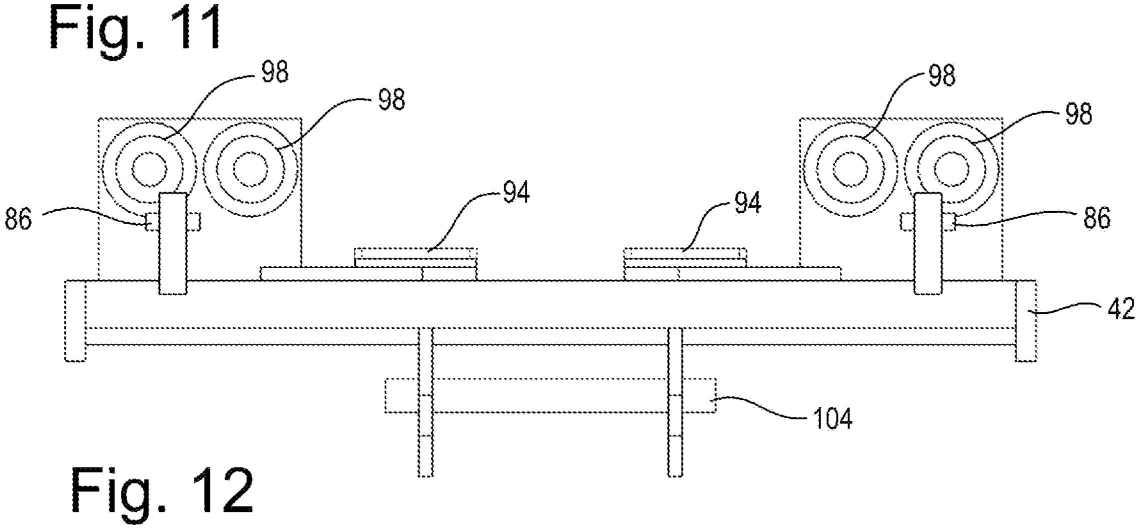
FIG. 12 is a top view of the component shown in FIG. 10.

As shown in FIG. 8 the third carriage 44 comprises a plurality of attachment structures equivalent to the hook 78 previously described. In this example 3 attachment positions are provided including a first position 110 wherein the hook 78 previously discussed is attached to the boom 28 or second carriage 42. Also shown is a second position 112 where an attachment structure 114 is provided to attach to the pin 104 of the second carriage 42 or an equivalent pin 106 of the boom bracket 7 when the third carriage 44 is attached directly to the boom 28 without the first carriage 40 and/or second carriage 42. This second position 112 allows the carriage 44 to be installed in a position rotated 180° about a vertical axis relative to the position achieved when attached at the first position 110. This enables the third carriage 44 to be reversible such that the lifting forks, and all other structures of the third of carriage 44 may be used in two orientations as desired.

The reversible carriage, in addition to the high carriage attachment, allows for the third carriage to be rotated to face toward the vehicle 24. This application allows for cargo to be positioned and pushed away from the load, allowing the vehicle then to move out on top of the load. This position in some examples is best suited for use with the third forks 66 so the load can be split between the first lifting forks 46 and third lifting forks 66. In other words, during transport, this portion of the load is suspended from the first lifting forks 46 and supported by the boom 28 and part of the load or cargo is supported by the third lifting forks 66, which are not supported by the boom 28, but are more directly attached to the vehicle 24. Thus, strain on the boom 28 is reduced.

In addition to the second position 112, a third position 116 is provided by utilization of a third attachment 118 equivalent to the first attachment hook 78. This third position 116 fixes the third carriage 44 in an elevated position relative to the second position 112, which may be desired and some applications for different rotation or clearance as desired.

Figure 4:
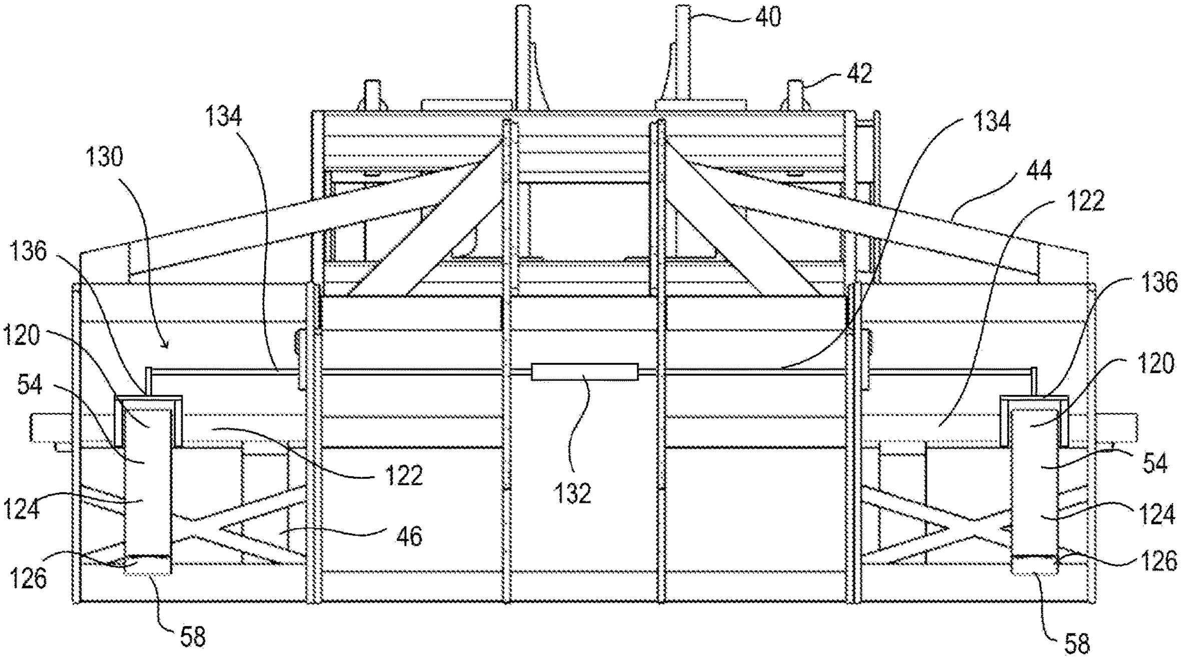
FIG. 4 is a front view of the forklift mechanism shown in FIG. 1.
Figure 5:
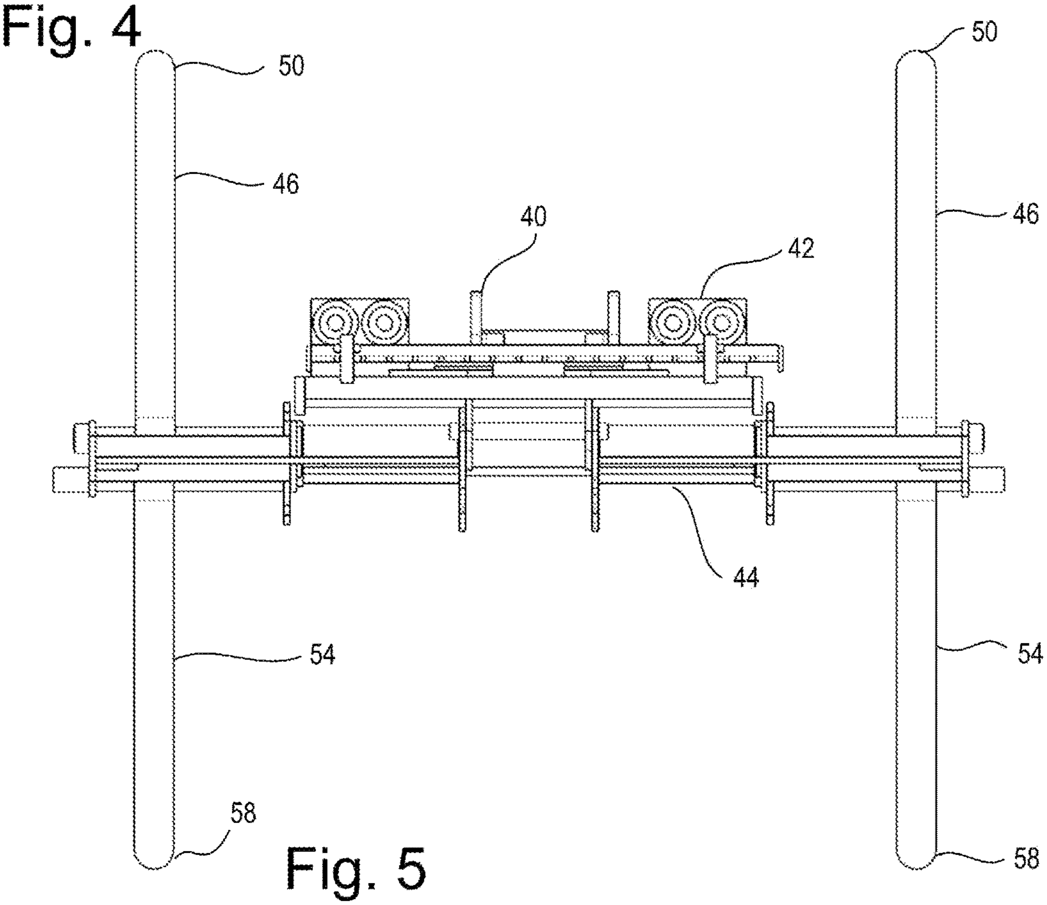
FIG. 5 is a top view of the forklift mechanism shown in FIG. 4.

As shown in FIG. 4, the lifting forks 54 comprise an eye portion 120, which slide along a lateral bar 122 of the third carriage 44. The lifting forks 54 also comprise a vertical drop portion 124 and a longitudinal portion 126. The listing forks 46 and the lifting forks 66 may be similarly constructed. In the example of FIG. 4, the forks 54 and the forks 46 are laterally offset. In the example of FIG. 5 the forks 54 and 46 are laterally aligned, and may be connected to move laterally in conjunction.

In FIG. 4 a lateral movement system 130 is included, comprising an actuator 132 connected to the lifting forks by way of an armature 134. The armature 134 may be connected to the lifting forks, or may be attached to a saddle 136 which slides along the lateral bar 122. When constructed in this manner, the saddle 136 allows the lifting forks to rotate about the lateral bar 122 when the lateral bar 122 is cylindrical or another shape to allow rotation of the lifting forks thereabout. In the example of FIG. 8, a plurality of lateral bars 122 are shown on either lateral side of the third carriage 44 such that the forks 54 and 46 may be moved independently. In other examples a single lateral bar 122 is provided and the lifting forks are attached independently or as a single unit on either lateral side.

In some applications the vehicle 24 may not come equipped with a structure for attachment of the third forks 66 to the vehicle 24. Thus, a vehicle carriage 138 may be provided. The vehicle carriage 138 comprising a plurality of attachment arms 140 which are attached to the vehicle 24. In one example the vehicle 24, the attachment arms 140 and a connector arm 142 comprise a four bar linkage configured such that an actuator 144 attached between the carriage 138 and the vehicle 138 functions to raise and lower the connector arm 142. Similar to the lateral bar as previously discussed, the vehicle carriage 138 comprises a lateral bar 146 to which are attached the lifting forks 66. Thus as the actuator 144 raises and lowers the connector arm 142, the lateral bar 146, and attached forks 66 are raised and lowered as desired.

In operation, it was found that an operator within the cab of the vehicle 24 had difficulty seeing the cargo 52 adequately to correctly position the cargo 52 due to its proximity to the vehicle 24 and vertical position close to the ground. Thus a plurality of mirrors 150 attached to mirror brackets 152 on the boom 28 have been provided. These mirrors 150, having a reflective surface such that the operator on the vehicle 24 can see the cargo 52, including in one example the distal edge 64.

Proximal-toward or nearest the trunk or the point of origin of a part (example, the proximal end of the femur joins with the pelvic bone). Distal-away from or farthest from the trunk or the point or origin of a part (example, the hand is located at the distal end of the forearm).

While the present invention is illustrated by description of several embodiments, and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicant's general concept. The invention illustratively disclosed herein suitably may be practiced in the absence of any element which is not specifically disclosed herein.

The invention claimed is:

1. A forklift mechanism comprising:
- a carriage assembly configured to be mounted to a distal end of a boom attached to a vehicle;
- a first lifting structure of the vehicle configured to vertically raise the distal end of the boom, the carriage assembly, and structures (cargo) supported by the carriage assembly;
- a first pair of lifting forks mounted on the carriage assembly longitudinally directed substantially toward the vehicle;
- the first pair of lifting forks having a proximal end attached to the carriage assembly, a proximal end closer to the vehicle than the distal end;
- the boom extending longitudinally past the distal end of the first pair of lifting forks;
- a second pair of lifting forks mounted on the carriage assembly;
- the second pair of lifting forks having a proximal end attached to the carriage assembly, a distal end;
- the first lifting forks extending from the carriage assembly in a first longitudinal direction, the second lifting forks extending from the carriage assembly in a second longitudinal direction away from the first lifting forks; and
- the second longitudinal direction substantially opposing the first longitudinal direction.

2. The fork truck lifting mechanism as recited in claim 1; further comprising:
- the carriage assembly comprising a first carriage removably attached to the lifting structure;
- a third carriage fixed to the lifting forks; and wherein the third carriage is removably attached to the first carriage via a latching system and retained in place via a locking system separate and cooperating with the latching system.

3. The forklift mechanism as recited in claim 2 wherein the first lifting forks are laterally movable on the third carriage.

4. The fork truck lifting mechanism as recited in claim 1 comprising a second carriage attached to the boom, wherein the second carriage is longitudinally offset from the first carriage.

5. The fork truck lifting mechanism as recited in claim 1, the second carriage comprising a lateral movement actuator configured to move the third carriage laterally relative to the first carriage.

6. The fork truck lifting mechanism as recited in claim 1 further comprising;

a second lifting structure configured to be mounted to a vehicle;

the second lifting structure configured to vertically raise a third pair of lifting forks relative to the vehicle;

the third pair of lifting forks longitudinally directed substantially away from the vehicle;

the third pair of lifting forks longitudinally directed substantially toward the first pair of lifting forks;

the third pair of lifting forks having a proximal end attached to the second lifting structure, a distal end, the proximal end closer to the vehicle than the distal end.

7. A forklift mechanism comprising:

a first lifting structure configured to be mounted to a vehicle;

a first pair of lifting forks mounted on the first lifting structure;

the first pair of lifting forks longitudinally directed substantially away from the vehicle;

the first lifting structure configured to vertically raise the first pair of lifting forks and structures (cargo) supported by the first carriage assembly relative to the vehicle;

the first pair of lifting forks having a proximal end attached to the first lifting structure, the proximal end closer to the vehicle than the distal end;

a boom extending longitudinally past the distal end of the first pair of lifting forks;

the boom having a proximal end attached to the vehicle, a distal end away therefrom;

a second pair of lifting forks attached to the distal end of the boom;

the distal end of the boom vertically movable relative to the vehicle;

the second pair of lifting forks having a proximal end attached to the distal end of the boom;

the second pair of lifting forks having a distal end;

the first pair of lifting forks extending from the first carriage assembly in a first longitudinal direction, the second pair of lifting forks extending from the distal end of the boom in a second longitudinal direction toward the first pair of lifting forks; and the second longitudinal direction substantially opposing the first longitudinal direction.

* * * * *